United States Patent [19]

Tacchi

[11] Patent Number: 5,089,098
[45] Date of Patent: Feb. 18, 1992

[54] APPARATUS AND METHOD FOR OZONE PRODUCTION

[76] Inventor: Ernest J. Tacchi, 413 Hounds Run W., Mobile, Ala. 36608

[21] Appl. No.: 639,703

[22] Filed: Jan. 10, 1991

Related U.S. Application Data

[62] Division of Ser. No. 475,432, Feb. 5, 1990, Pat. No. 5,004,587.

[51] Int. Cl.$^5$ .................. C01B 13/10; B01J 19/12
[52] U.S. Cl. .................. 204/176; 422/186.15
[58] Field of Search .............. 422/186.07, 186.21, 422/186.22, 186.18, 186.19; 204/157.15, 158.2, 164, 176

[56] References Cited

U.S. PATENT DOCUMENTS

| | | | |
|---|---|---|---|
| 4,048,668 | 9/1977 | Von Bargen et al. | 361/235 |
| 4,153,560 | 5/1979 | Dinter et al. | 422/186.05 |
| 4,298,844 | 11/1981 | Hood | 204/165 |
| 4,614,573 | 9/1986 | Masuda | 204/176 |
| 4,654,199 | 3/1987 | Gloor et al. | 422/186.19 |
| 4,859,429 | 8/1989 | Nisenson | 422/186.13 |
| 4,940,894 | 7/1990 | Morters | 422/186.04 |
| 5,004,587 | 4/1991 | Tacchi | 422/186.19 |
| 5,009,858 | 4/1991 | Mechtershelmer | 422/186.19 |

Primary Examiner—Brooks H. Hunt
Assistant Examiner—Daniel J. Jenkins

[57] ABSTRACT

Disclosed herein is an apparatus and method for the production of ozone gas comprising: a parallel resonance circuit formed by a high voltage transformer and a companion flexible polymeric corona discharge chamber which encloses an electrode and serves as both a passageway and reservoir for oxygen bearing gas, and a fluid counter-electrode, all contained within an appropriate enclosure. Said corona discharge chamber possesses an electrical reactance which can be varied in order to match the electrical reactance of a companion high voltage transformer so that the components resonate, thereby maximizing the transfer of energy to the corona discharge gap. The dwell of corona discharge is further enhanced by an electrostatic potential incorporated across said tube wall (electret effect). Heat formed in said discharge gap (detrimental to ozone production) is advantageously transferred to said fluid counter-electrode which also serves as an electrolytic connection between said high voltage transformer and said corona discharge chamber. Within said chamber, relatively large volumes of oxygen may be exposed to the high field density, ozone producing, resonating discharges as a consequence of its flexible and linear design. The apparatus and methods described herein permit and encourage the use of intermittent and cyclic application of resonating energy and therefore achieves an improved degree of electrical efficiency. The teachings of the present invention make practical the use of alternative sources of energy for the private and commercial generation of ozone gas.

2 Claims, 10 Drawing Sheets

Fig. 1b   Fig. 1a
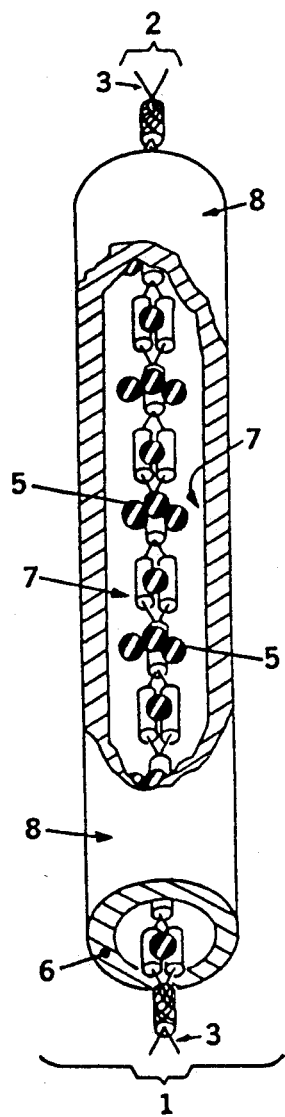
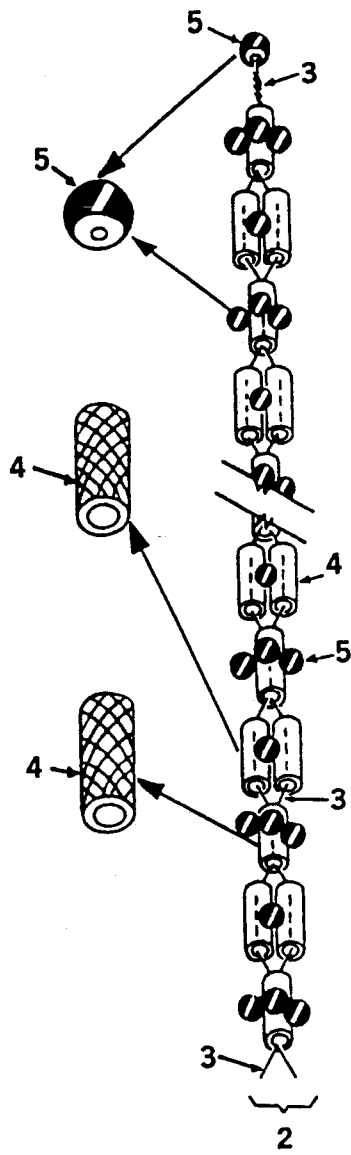
Fig. 1c   Fig. 1d
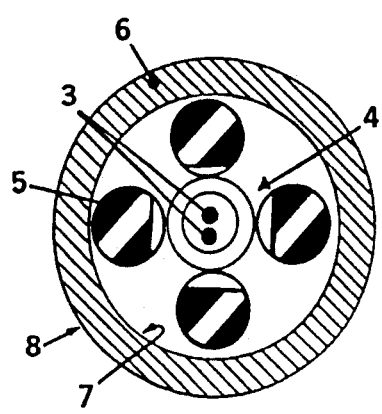
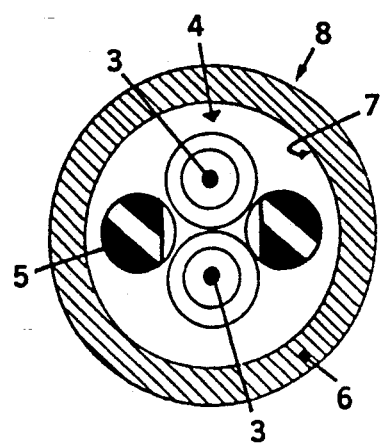

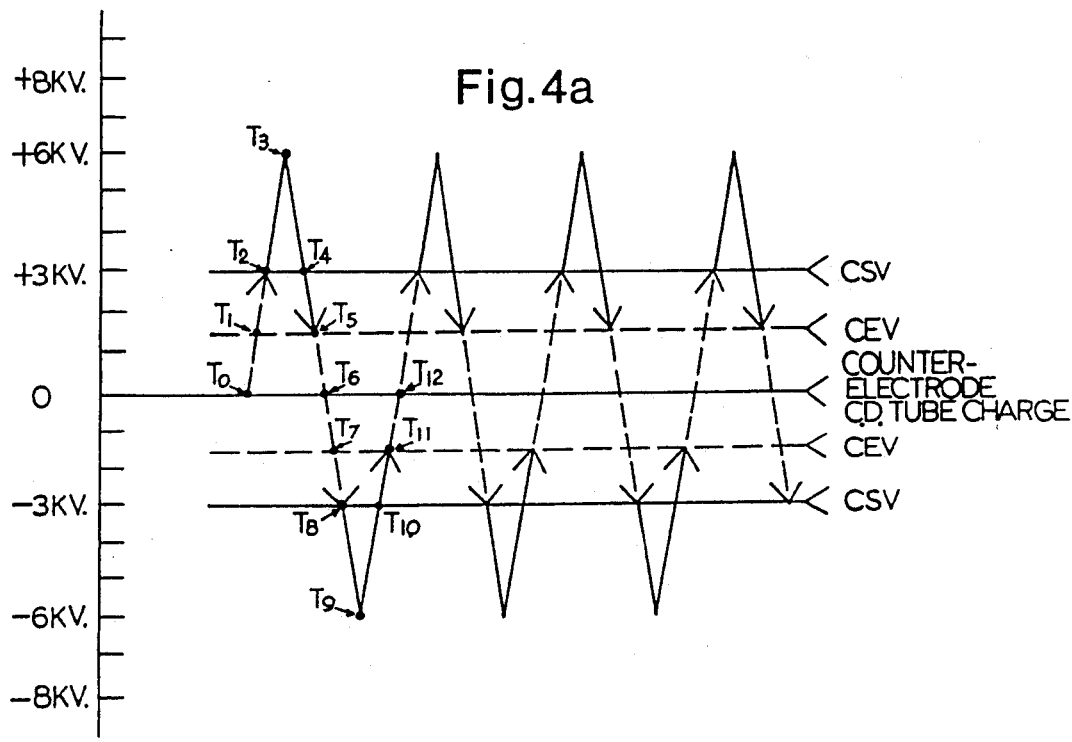
THERMO-ELECTRET EFFECT
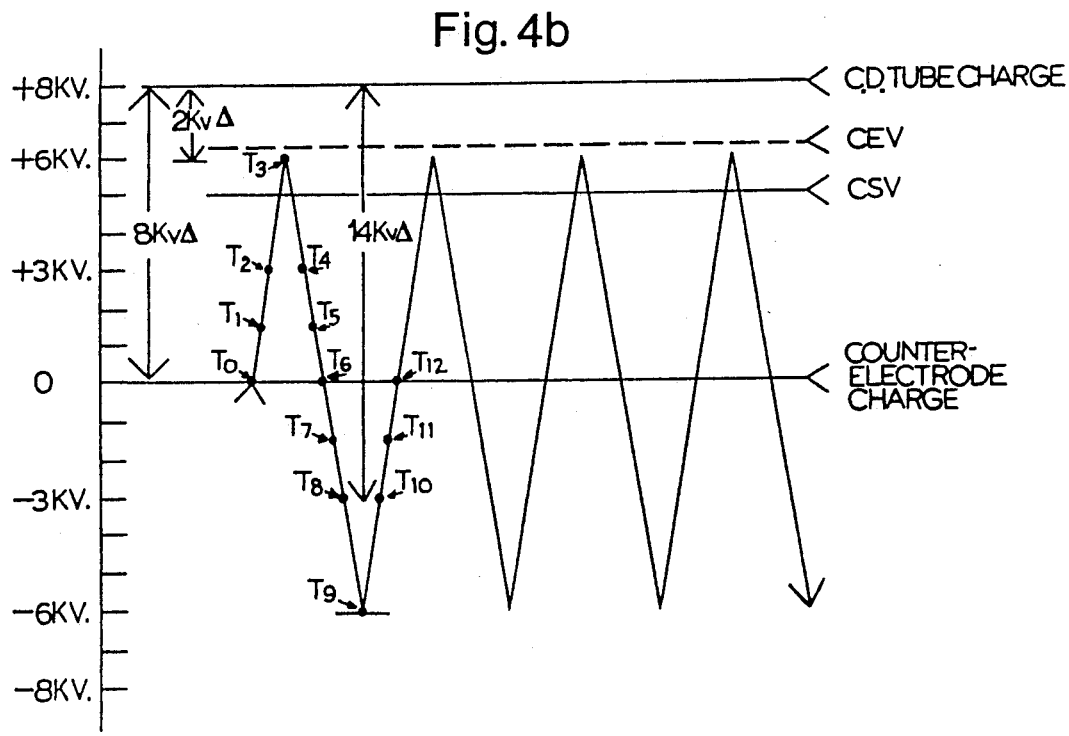

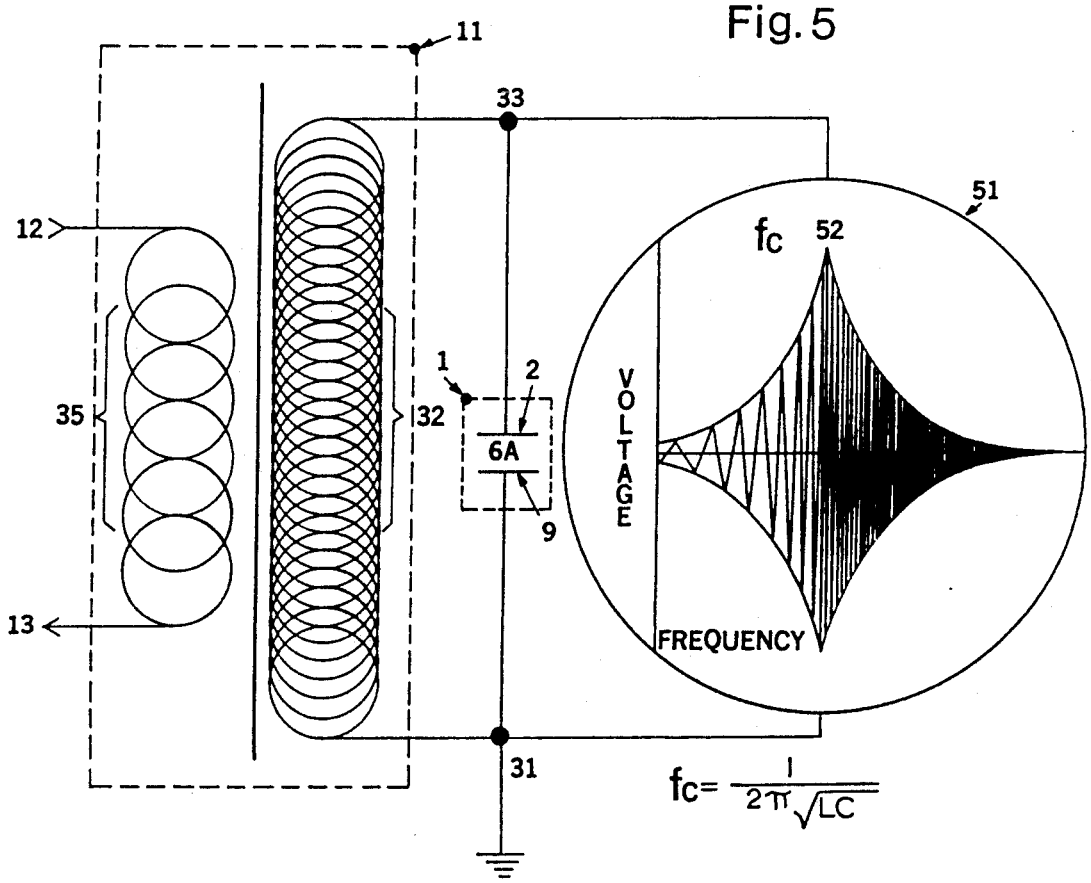

APPARATUS AND METHOD FOR OZONE PRODUCTION

This is a division of application Ser. No. 07/475,432, filed Feb. 5, 1990, now U.S. Pat. No. 5,004,587.

BACKGROUND OF THE INVENTION

1. Field of the Invention

This invention relates to ozone generators and is more particularly concerned with a method and apparatus which allows for the controlled production of ozone gas by the direct application of electrical energy input.

2. Description of the Prior Art

Many authorities believe ozone gas to be a superior oxidizing agent. Devices to manufacture ozone gas have before been inefficient and costly to build thus severely limiting their practical application for the private or commercial generation of ozone gas. Therefore, the oxidative treatment of waste fluids, gases, and solids has heretofore been accomplished with alternate oxidative agents such as various dioxides, peroxides, chlorine, or other halogenated compounds. These compounds are not only dangerous during periods of acute exposure, producing a variety of illness syndromes, but several of these compounds as well as their by-products are known to be potent carcinogens. Some examples of these carcinogenic substances would include chloramines, tri-chloroethane (TCE), and tri-halomethanes (THM). In addition most of these alternative oxidizing agents require the potentially hazardous steps of manufacture, transportation, and storage. Oxidative treatment of substances by ozonation avoids the hazards of transportation and storage of these dangerous compounds as ozone gas may be both made and used on site. Because of its superior oxidizing capability, second in nature only to elemental fluorine, ozone gas probably inactivates the majority of these halogen-based carcinogenic compounds rendering them non-carcinogenic, (Burleson and Chambers, Environmental Mutagenesis, 4:469-476, 1982).

Ozone is generally formed by the action of oxygen atoms on oxygen molecules. The splitting of the oxygen molecule can be achieved by applying electrical, optical, chemical or thermal energy. As is well known, splitting of the oxygen molecule may be effected by subjecting oxygen to thermal energy. However, this method is inefficient since elevated temperatures used to produce ozone by heating, or with chemical reactions which cause heat production, favor the thermal degradation of ozone immediately as it is produced. Ultraviolet light ozone generators, such as those disclosed in Pincon U.S. Pat. No. 4,124,467, and Beitzel U.S. Pat. No. 4,189,363, produce concentrations of ozone suitable only for minimal decontamination, purification, or oxidative treatment. Other means of generating ozone have generally involved electrical means, i.e., corona discharge units (using either cylindrical tubes or flat plate generators) and hollow-cathode plasma discharge assemblies. The cathode plasma discharge assembly, such as that disclosed by Orr, Jr. et al U.S. Pat. No. 4,095,115, produces ozone gas by exposing an oxygen enriched medium to a high-energy electron beam causing splitting of the oxygen molecules into singlet oxygen and/or ozone. Devices of this sort produce only a maximum concentration of less than 500 parts per million ozone in air but require extremely high velocities of gaseous injection to achieve even this modest concentration of ozone. Additionally, the overall efficiency of this system is compromised because of the energy requirements of pumps, gauges, power supply inefficiencies, etc.

Other electrical means of generating ozone gas universally depend upon the cold spark of corona discharge in order to split the oxygen molecule. Corona discharge units commonly depend upon the field intensified ionization of an oxygen bearing gas which occurs within an insulating system. The luminous discharge of electricity due to the ionization of the gas within such an insulating system will occur when the field potential gradient of an alternating current exceeds a certain value termed the corona start voltage (CSV). If the strength of the insulating system is not exceeded and the system does not immediately break down in a catastrophic manner, then a non-disruptive electrical discharge will occur and continue until the voltage is reduced to the corona extinction voltage (CEV). Corona extinction voltage is always at a lower potential than the (CSV). This is well illustrated in attached FIGS. 4a and 4b.

The values and relationships of the (CSV) and (CEV) are important in that they define the period of latency; that period of time during each cycle of alternating current application in which no corona discharge is present within the tube to produce ozone gas. The alternating current cycle is bidirectional in that it travels both above and below ground potential. As the wave of electrical potential is passing upward from ground as in FIG. 4a at point T0 and at (CEV) point T1, insufficient ionization potential is present within the corona discharge gap to permit corona formation and subsequent ozone production. It is not until the wave exceeds (CSV) at point T2 that corona discharge begins. Ozone producing corona discharge will continue as the wave travels in the direction of point T3, its maximum positive excursion, and continues until the wave potential drops below point T5 the (CEV). The wave continues its fall through ground potential at point T6 and (CEV) at point T7, until reaching the (CSV) (in the opposite polarity) at point T8. Corona discharge is re-established and continues through the maximum negative excursion at point T9 and through (CSV) at point T10 until reaching (CEV) at point T11 traveling toward and reaching ground potential at point T12. FIG. 4a graphically illustrates that there is a significant period of time during each cycle of alternating current application wherein no ozone gas can be produced (illustrated by the broken lines in the electrode potential waveform). In any corona discharge apparatus, this less-than-optimal cycle repeats itself at the frequency of alternating current applied thereto.

On the molecular level, these devices produce ozone by bombardment of the oxygen molecule with high-energy electrons causing a splitting of the diatomic molecule into charged oxygen atoms or singlets. These may randomly recombine with one or more charged oxygen atoms to produce oxygen ($O_2$) or ozone ($O_3$). They may also, in a random fashion, recombine with diatomic oxygen molecules to produce ozone. Because of the random nature of this recombination of oxygen atoms and oxygen molecules, a metastable equilibrium state will be achieved. Concentrations of up to 5% of ozone in pure anhydrous oxygen can be prepared in this manner. The oxidative treatment of large volumes of fluid, solid and/or gaseous substances will require a proportionately large volume of ozone gas. The capital expenses of purchasing, storing, and utilizing pure oxygen may limit its practical and economic merit for use in ozone gas generation. Air, having an oxygen concentration of approximately 21%, is a reasonable alternative source of oxygen molecules but has the drawbacks of being composed mainly of nitrogen (approximately 78%), and also having variable amounts of water vapor diffused within it. When exposed to high temperatures and high voltages (typically greater than 15,000 Volts), the nitrogen molecules in air will ionize and break into singlets which may combine with oxygen atoms or molecules to form undesired nitrous oxide compounds. This situation can be further complicated by the reaction of hydrogen atoms from water vapor reacting with the nitrous oxide compounds to produce unwanted and toxic nitric acids. Additionally, water vapor detrimentally lowers the spark voltage in the corona discharge chamber further limiting the efficiency of ozone gas production.

Previously described flat plate corona discharge units, such as those disclosed by Lowther (U.S. Pat. No. 3,996,474) and Erz et al. (U.S. Pat. No. 4,545,960), have utilized materials of high dielectric constant which are breakable, fragile, expensive to manufacture, generate excessive heat, and require elaborate schemata to remove the heat produced. Electrical energy for ozonation may also be supplied for example by the so-called "Siemens ozonizer" and variations therefrom, which are in essence devices comprised of two telescoping coaxial glass tubes whose outer and inner walls respectively are made electrically conductive, are water cooled, and which are electrically connected to the terminals of an alternating current power supply. Electric discharges take place in the narrow annular chamber between the glass tube walls when an alternating current is applied thereto, a dry system of oxygen or air being passed through this chamber. Multiple variations of this basic theme have been described in the prior art, (to U.S. Pat. No. 4,725,412, Hirth U.S. Pat. No. 4,690,803, Sasaki U.S. Pat. No. 4,696,800, and Slipiec et al U.S. Pat. No. 3,967,131).

Apparatus of this nature, while having been much improved in the meantime, are still bulky, cumbersome, difficult and costly to manufacture, poorly durable, and they employ rigid fragile materials in their manufacture and construction. For example, Hirth's ozonizer tube utilizes a rigid dielectric member coated with a glaze of titanium oxide ceramic and therefore achieves a high dielectric constant with an increased spark voltage and increased ozone production, but only at the cost of degradation of a portion of the newly generated ozone due to heat accumulation. This construction is not only expensive but relatively fragile. Any break, crack, or puncture of the rigid dielectric shield member will cause high voltage, disruptive arcing and self destruction of the device thereof. In addition, there must be practical limitations to the physical length of such an ozonizing tube, which therefore limits the surface area and volume of a gas which can be exposed to ozonizing currents at any one point in time.

Any attempt to increase the volume of gas which can be exposed to ozonizing current by simply increasing the annular space in a rigid ozonizer tube will result in reduced ozone production because the electric field density will be proportionately diminished. This phenomena is a well known law of nature (the inverse square law) wherein the strength of field intensity decreases in proportion to the square of the distance from the energy source.

Only a portion of the energy of corona discharge (about 34 kcal. per gram mole) is required for formation of ozone (Handbook of Chemistry and Physics 69th Ed. 1988-89, Library of Congress #13-11056). The remaining energy will dissipate as heat and light. If this excess energy is not rapidly transferred from the system, then the temperature of the effluent gases, electrode, dielectric shield, and housing will rise. This may lead to a more rapid decomposition of a portion of the ozone which, at approximately 100 degrees Centigrade, breaks down almost as soon as it is formed. Prior attempts at increasing ozone production have stressed the utilization of insulators with a high dielectric constant such as glass or ceramics interposed between the electrodes. The prior art has emphasized the importance of using insulators with dielectric constants ranging from 8-12,000 in order to achieve their stated goal. Despite the increased corona spark voltage and the increased production of ozone therefrom, the heat generated by electrical excitations in these materials of high dielectric constant causes loss of ozone through degradation due to excess heat formation. Of even greater importance is the extreme total energy loss produced by dielectric heating per se (Modern Electronics Communications, by Gary Miller, 1978, Library of Congress #77-25881, page 364) and (Buchsbaum's Complete Handbook of Practical Electronic Reference Data, 1978, Library of Congress #78-1055, second edition page 551).

Dielectric losses result from heating of the insulating materials between the electrode and counter-electrode when an alternating current is applied thereto. Materials most susceptible to this type of heating are known as "lossy" type dielectrics. A means for predicting losses caused by dielectric heating is easily determined by the product of the dielectric constant and the power factor. The power factor is the ratio of resistance to impedance of the dielectric material.

The production of heat within a dielectric requires energy which must be taken from the power source. Application of an alternating current electric field formed by the alternating potential difference between the two electrodes (electrode and counter-electrode) across an insulating dielectric member will cause distortion of the normal electron spin paths of the atoms comprising the dielectric insulator. The electron paths will be altered because they will be alternately repelled by the negative potential of one electrode and attracted to the positive potential of the counter electrode and vice versa. The structures of the atoms of some materials are harder to distort, i.e., glass, ceramic, polyvinylchloride (PVC), rubber; thus more energy is absorbed from the power source. The electron paths of some atoms are easily altered and require very little energy from the source, i.e. polyethylene, polystyrene, polytetrafluoroethylene (PTFE), and silicone materials. As a general rule, insulators with a low dielectric constant will have more easily altered electron spin paths and hence lower susceptibility to dielectric heating.

Distortion and subsequent heat formation in the dielectric material are directly proportional to the peak voltage applied across the dielectric as well as the frequency of the alternating current source. Even though dielectric losses play a significant role in the deficiencies of the prior art leading to inefficiency in the generation of ozone, of paramount importance is the previously unrecognized significance of maximizing energy transfer to the corona discharge gap.

The multiplicity of constraints of the prior art concerned with the methods and apparatus for the production of ozone gas including the electrical and mechanical inefficiencies, the relatively large size of previous chambers, and the expense of construction, has limited the practical applicability of the heretofore described devices and methods. Both the theoretical and practical improvements of the present invention will become clear as the discussion proceeds.

SUMMARY OF THE INVENTION

It is the goal of the present invention to provide means for resolving the above problems. In addition, the embodiment of the present invention is designed to encourage both the private and commercial utilization of ozone gas as an oxidizer by fulfilling the following objectives:

It is the first object of the present invention to provide a device Which generates sufficiently high concentrations of ozone gas so as to be useful in the terminal oxidative treatment of large volumes of fluid, solid, and gaseous substances.

It is the second object of the present invention to construct an ozonation system which is durable, relatively non-breakable, and easily manufactured with exchangeable parts and readily available inexpensive materials.

It is the third object of the present invention to construct a corona discharge chamber of flexible or easily deformable dielectric materials which can be arranged in a multiplicity of configurations, allowing for packaging of the device in a relatively small volume of space.

It is the fourth object of the present invention to produce ozone gas by a method and apparatus of such improved electrical efficiency so as to make the use of alternative sources of energy both practical and economically feasible. These sources include, but are not limited to: solar, hydroelectric, wind, thermoelectric, and micronuclear power.

The ozonizer chamber of the present invention comprises a flexible high tension electrode and supporting spacers loosely enclosed within the lumen of a flexible dielectric tubing which physically separates and electrically isolates the high tension electrode from a counter-electrode surrounding the outside of the flexible dielectric tube. The inside of the tube functions as a reservoir and passageway for dry oxygen bearing gas through which ozone producing electrical discharges will occur between the high tension electrode enclosed by the dielectric tube, and the counter-electrode outside and completely surrounding the tube. Because the tube is flexible and deformable, it may be constructed in almost unlimited length and may be configured or deformed into almost any shape. In this way, the surface area of ozonation as well as the volume of gas to be exposed to the ozonizing current may be expanded or reduced simply by increasing or decreasing the linear dimension of the corona discharge chamber and its associated electrode and counter-electrode.

It is particularly advantageous to construct this cylindrical corona discharge chamber utilizing an insulating material of low dielectric constant interposed between the electrode and the counter-electrode. This design avoids the excessive heat production and subsequent thermal degradation of newly formed ozone caused by dielectric loss (heating). However, using an insulator of low dielectric constant between the electrode and counter-electrode tends to lower the corona spark voltage and hence the field intensity within the tube unless steps are taken to maximize the transfer of electrical energy into the discharge gap.

Conspicuously absent from the prior art is any mention or apparent recognition of the importance of impedance matching between the alternating current power supply and the ozone generating corona discharge chamber. The phenomenon of parallel circuit resonance, a well recognized principle in the radio-communications prior art, but not heretofore recognized or utilized in the art of ozone gas generation, has been found by this inventor to be of utmost importance in the efficient generation of ozone gas by maximizing the transfer of energy into the corona discharge gap.

The corona discharge chamber of the present invention primarily responds to the flow of alternating electrical current as does a capacitor. The high voltage transformer of the present invention, to which the corona discharge chamber is electrically connected, acts primarily as does an inductor. The corona discharge chamber and its companion high-voltage transformer are connected in a parallel fashion and can be viewed as, and perform as, a parallel resonance circuit as illustrated in FIG. 5. Each of the two components of this parallel resonance circuit offer frequency dependent impedance to the flow of alternating current.

Generally speaking, higher frequency currents will pass or flow more easily through a capacitor, whereas lower frequency currents will pass or flow more easily through the inductance of a coil. At some particular frequency, the impedance of each of these components will be equal but 180 degrees out of phase so that their individual impedances will cancel, while a maximum excursion of voltage (peak voltage) will occur across both of the components. It is at this point that the maximum transfer of energy will occur between the transformer and the corona discharge chamber through the phenomena of electrical resonance. In order to sustain the maximum peak voltage across the components and the peak flow of current between the components, it is only necessary to supply additional resonating energy to replace system deficits. These deficits consist of the minimal electrical losses caused by the impedance of the conductors themselves, and more significantly that amount of electrical energy absorbed in the corona discharge gap for the formation of ozone. Therefore, by employing a parallel circuit and resonant impedance matching between the high voltage transformer and its companion corona discharge chamber, it is possible to achieve a high spark voltage and matching field density within the tube even when it is constructed of low dielectric constant material.

All things being equal, an increase in the length of the ozonizing chamber (also increasing the volume of gas enclosed by said chamber) will increase the electrical capacitance of said chamber and hence change its impedance at any prescribed frequency of resonance. In order to produce ozone gas efficiently it is advantageous to use the highest possible frequency of resonance. It has been found that increasing the number of electrical excitations per unit time (frequency) is attributed to an increase in ozone formation because energy transfer in an alternating current system occurs primarily when voltage and current are changing. It follows, that increased frequency is synonymous with increased energy transfer. The highest frequency of electrical resonance should be physically limited primarily by the electrical reactance of the paired high voltage transformer and corona discharge chamber.

The corona discharge chamber may be constructed with a great linear dimension, and as such, the volume of gas to be exposed to the ozonizing current within the tube will likewise be expanded. The practical determinant of the actual length of the corona discharge tube depends upon the need to adjust the capacitive reactance of the corona discharge chamber by varying its physical length in order to match the inductive reactance of its companion power transformer at some predetermined frequency of resonance.

Because the frequency of the alternating current applied to the tube in a resonating fashion is so critically important to the efficient generation of ozone, one of the primary objectives of the design herein is to minimize both the capacitive and inductive reactance of both components and thus establish a higher intrinsic frequency of resonance. This object can only be realized if the electrical capacitance of the corona discharge chamber is not allowed to become excessive. If the counter-electrode were constructed with a continuous and/or painted conductive layer surrounding the outer circumference of the tube e.g.: (U.S. Pat. No. 4,725,412 Ito, and U.S. Pat. No. 3,739,440 Lund et. al.) experimental data shows that a higher value of capacitance would be realized. The increase in capacitive reactance would serve to lower the frequency of resonance and hence reduce the yield of ozone gas. Additionally, the corona discharge chamber of the present invention is designed to be flexible in all planes of deformation. The bending deformation of the dielectric tube which may occur during packaging as well as the micro-vibratory motion of the dielectric tube which occurs during energy applications tends to produce both static and dynamic mechanical stresses. These potentially damaging stresses would be transferred to any continuous or painted conductive layer applied to the outer surface of the tube. For these reasons, it is particularly advantageous to construct the corona discharge chamber without a continuous metallic conductor surrounding its circumference as disclosed by the embodiment of the present invention.

Any high voltage electrical system will necessarily produce some heat and removal of this generated heat remains vitally important if ozone is to be produced in an efficient manner. The present invention provides a strikingly simple, but heretofore unrecognized, resolution to this problem by employing a fluid counter-electrode of high electrical conductivity which simultaneously functions as an electrolytic power connection (change electron current to ion current) to the chamber as well as an excellent means for heat removal. As fluids are known to be very efficient conductors of thermal energy, the present invention utilizes a fluid to serve in both capacities. The use of a fluid counter-electrode similarly represents a significant departure from the previously described ozone generating devices.

Prior art ozone generating apparatus often produce undesirable and toxic nitrous oxides when air is used as the gaseous medium. As the formation of nitrous oxides are encouraged by the application of high voltages (typically greater than 15,000 volts) and elevated temperatures, the components of the corona discharge chamber assembly of the present invention are never allowed to accumulate excessive heat energy or exposure to extreme voltages. High voltages are easily avoidable because the application of resonating current to the high voltage transformer and its companion corona discharge chamber is fully adjustable in terms of the amplitude of resonating energy applied, the duration of resonating energy application, and the interval of time between the applications of resonating energy application. The lumen of the corona discharge chamber remains relatively cool because the fluid counter-electrode continuously absorbs thermal energy by conduction as well as the optical radiation of corona discharge produced within the translucent dielectric tube. The preferred embodiment of the present invention produces no significant concentration of nitrous oxides when operated at typical voltage levels.

When corona discharge has achieved the desired maximum concentration of ozone gas within the entire internal volume of the tube, any additional application of ozonizing current is wasteful. It is only necessary to intermittently apply resonating ozonation current to the tube in order to maintain the plateau concentration of metastable ozone. The corona discharge chamber of the present invention contains and encloses a fixed volume of gas. When the flowrate of gas through the chamber is maintained at a steady state during operation (fixed volume per unit time), then a numerical time constant can be identified. This time constant is useful as a reference in determining and adjusting both the interval and duration of energy applications to the corona discharge chamber. In this way, ozone gas production is precisely and adjustably matched to ozone gas utilization. This method and apparatus functions so as to provide for intermittent application of resonant energy to the tube while at the same time allows for the continuous transfer of generated heat from the corona discharge chamber and into the liquid counter-electrode for subsequent dissipation, thus helping to improve the overall system efficiency.

The improved electrical efficiency of the present invention is also a function of the low dielectric constant material of the corona discharge chamber behaving as an electret. The technique of thermo-electret formation is well known prior art. It was originally described by Eguchi, 1919 (Japan), and as such, there is no need to describe the phenomenon and technique in anything more than general terms. However, as far as I know, the thermo-electret process has not heretofore been described in relation to ozone gas generators. An electret is an insulating material (dielectric) which retains an induced electrostatic charge in its structure for a long period of time. The process of forming the "permanent" electrostatic charge includes the steps of elevating the temperature of the dielectric material while subjecting it to an electric field during the cooling process. When the electret is formed, the material is said to be polarized; meaning that charges on its surface have been oriented in a preferred direction. When individual positive/negative charge pairs are aligned in the same direction throughout the dielectric material, it is said to be heterocharged. This arrangement is significant in that it allows charges of high-potential to be fixed on one surface of the dielectric material with opposing charges fixed on the opposite surface. This arrangement is similar to the dipoles created in the dielectric material of a capacitor. Heterocharge and dipole mean the same thing in this context, but the dipoles set up in the dielectric of a capacitor are only a temporary phenomenon associated with the instantaneous voltage applied across the capacitor plates. Incorporation of a high potential thermo-electret charge into the dielectric structure of the corona discharge chamber is advantageous to ozone production efficiency by improving the quality and quantity of corona formation. This concept will be explained in greater detail as the disclosure of specification proceeds.

Referring to FIG. 4a, there is a period of time during each cycle of alternating current application to the corona discharge chamber wherein no ozone gas is produced. Whenever the potential difference between the electrode and the grounded counter-electrode drops below the corona extinction voltage (CEV), and whenever the voltage is approaching but has not exceeded the corona start voltage (CSV), there will be insufficient ionization potential within the discharge gap to form ozone. This period, during which there is no corona formation, occurs in both polarities. By incorporating an electret effect into the design and construction of the corona discharge chamber (represented in FIG. 4b by a shift in the baseline potential labeled CD Tube Charge), as illustrated in FIG. 3a and 3b, one can elevate or lower the baseline potential in the discharge gap to reduce that period of time wherein there is insufficient ionization potential to produce ozone gas. In effect the period of corona formation, during each cycle of excitation current, is increased and possibly made continuous. Please note, that incorporation of an electret charge does introduce the potential for a slight energy loss through increased dielectric heating. However, this slight loss is more than offset by improved corona activation.

Because the allotropic form of oxygen, 03 (ozone) is considered a metastable dipole, it is reasonable to suspect that this molecule will align itself with the electrostatic charge intrinsic to the dielectric material of the corona discharge chamber when it is acting as an electret. This alignment might well provide temporary stabilization, sequestration, and/or protection from breakdown of already produced 03 molecules. In this way, the maximal concentration of generated ozone may be further enhanced and maintained within the chamber.

The art of ozone gas production has a long and varied history. Many improvements have been made in the design and function of electrical ozonizers, accompanied by a concurrent expansion in their applications. If the role of ozone gas is to be further expanded as useful art in fluid, solid, or gaseous oxidative treatment, then the remaining limitations of the prior art must be overcome.

Specifically, the present invention produces relatively high concentrations of ozone gas with improved electrical efficiency while constructed of easily available, low cost materials, which are durable and reliable in the configuration of the present invention.

The design, construction, and methods of the present invention provides five (5) individual areas of improvement over prior art ozone generating apparatus:

1. construction of the corona discharge chamber and high voltage transformer as a parallel circuit employing resonant impedance matching techniques which maximize energy transfer to the discharge gap and allow for the use of low dielectric constant insulating materials, 2. construction of a flexible corona discharge chamber assembly of adjustable capacitance and linear dimension with a relatively small internal diameter which serves to expose a relatively large volume of gas to a high electrical field density corona discharge while allowing for low volume packaging of the assembly, 3. intermittent application of resonant electrical energy into this impedance matched system, minimizing the amount of energy input to achieve a predetermined concentration of ozone gas within the tube, 4. incorporation of an electrostatic charge (electret) within and across the wall of the corona discharge chamber thereby increasing the percentage of corona period in which there is formation of ozone during each cycle of alternating current, and 5. utilization of a fluid counter-electrode to serve as an electrolytic connection a well as the heat dispersal mechanism for the corona discharge chamber.

In summary, each of these individual areas and components are relatively important and represent significant advancements in the art of ozone gas generation. The present invention encompasses and embodies each of these areas and components producing compound and synergistic improvements, which represent new and novel art not only in part, but also in union. The various components, improvements, methods, and their inter-relationships will be further detailed, and explained in the following descriptions and claims.

BRIEF DESCRIPTION OF THE DRAWINGS

FIG. 1 is a fragmentary (1a) and cutaway (1b), plan view of the corona discharge chamber apparatus of the present invention including two cross sectional views (1c and 1d).

FIGS. 4a and 4b are graphs of ozonizing current versus time as related to the period of corona formation; FIG. 4b shows enhanced corona formation by incorporation of the electret effect within the corona discharge chamber;

FIG. 5 schematically illustrates the tuned parallel resonance circuit formed by the high voltage transformer and companion corona discharge chamber of the present invention; the oscillographic insert to the right shows the effect upon voltage by varying the input frequency and is related to the algebraic equation for electrical resonance;

DETAILED DESCRIPTION OF THE PREFERRED EMBODIMENTS

Figure 2:
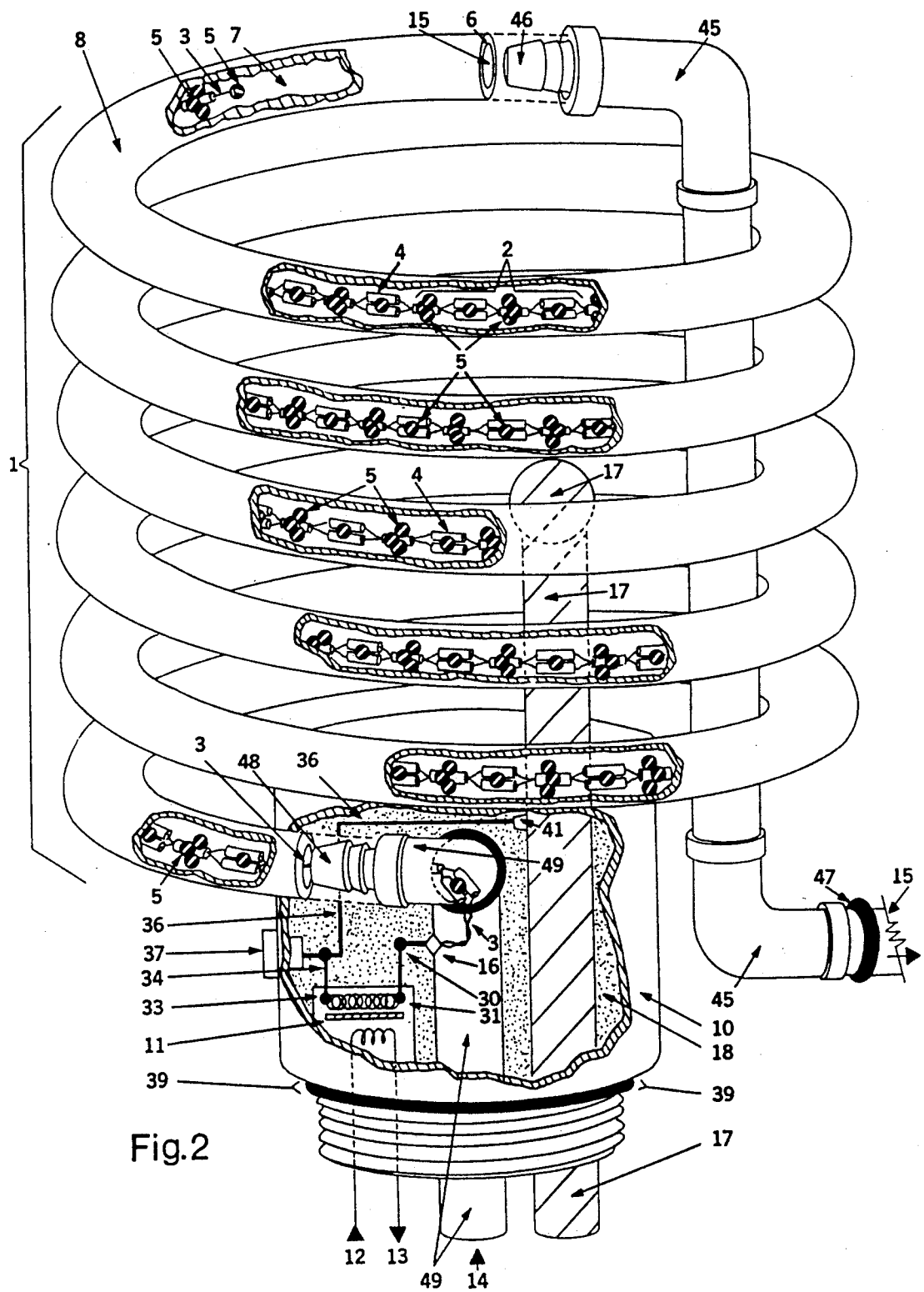
FIG. 2 is a view in perspective, partly cut away, illustrating one embodiment of the corona discharge chamber assembly in which the tube and high voltage transformer are mechanically joined in a singular unit.

Referring to FIG. 2, a labeled representation of one embodiment of the corona discharge chamber assembly of the present invention can be seen. Centermost in the construction of said corona discharge chamber 1 is the flexible high tension electrode 2 illustrated in FIG. 1. Said high tension electrode 2 is formed of thin gauge stainless steel wires 3 (gauge 24-30) which are interwoven with insulating spacers 4 in a crisscross pattern as best illustrated in FIG. 1. Gapping spacers 5 are formed of curved ceramic or glass beads which are fixedly attached to the outer surfaces of insulative spacers 4. Gapping spacers 5 serve to maintain a central positioning of said high tension electrode 2 within the lumen of dielectric tube 6. This form of construction allows said high tension electrode 2 to be flexible in all planes of deformation. In practice, said high tension electrode 2, when loosely enclosed within the lumen of an insulating tube 6, forms the corona discharge chamber 1 of the present invention.

Said insulating tube 6 comprises a flexible, deformable, and poorly compressible polymeric tubing formed of low dielectric constant material such as translucent polyethylene with an outer diameter between 0.25-0.5 inches, a wall thickness of 20-80 mils, and a variable length, typically between 10-100 feet. (Tubings of polystyrene, polytetrafluoroethylene (p.t.f.e), and silicone materials have all been used advantageously.) The lumen of said insulating tube 6, serves as a reservoir and passageway for the flow of dry oxygen bearing gas through which a high voltage corona is discharged to create ozone from resident oxygen molecules flowing through and enclosed by the inner surface 7 of insulating tube 6. This corona discharge originates between said high tension electrode 2 and a counter-electrode means 9 located outside and in intimate contact with the outer wall surface 8 of said insulating tube 6 which in effect, forms the corona discharge chamber 1.

The flexible electrode 2 and spacers 4 and 5 serve to maintain a semi-coaxial gap for corona discharge between the inner wall surface 7 of insulating tube 6 and the wire conductor 3 of high tension electrode 2 even when dielectric tube 6 is deformed into a coiled configuration. The insulating spacers 4 comprise small tubular glass and/or ceramic beads with an approximate linear dimension of 2-5 millimeters (mm), a wall thickness dimension of 0.1-0.4 mm, and an outer diameter of 0.5-2.0 mm. Gapping spacers 5 must be of such dimension so as to maintain a central positioning of high tension electrode 2 within the lumen of dielectric tube 6 without causing excessive obstruction to the flow of gas through said dielectric tube 6. The conductive wire 3 of high tension electrode 2 passes through the lumen of each of said dielectric spacers 4 in an interwoven pattern as illustrated again in FIG. 1. Said high tension electrode 2 is finished on each end with a curved ceramic or glass bead 5 in order to eliminate sharp end projections of wire conductor 3 of high tension electrode 2. Conceptually and practically speaking, a variety of wire(s) and spacer(s) configurations may be used to advantage so long as acute angles and projections of conductive wire 3 are avoided. Additionally, the configuration must cause the structure of high tension electrode 2 to remain centrally located within the lumen of dielectric tube 6 without causing excessive obstruction to gas flow.

FIG. 2 shows one embodiment of the composite tube assembly including the high tension electrode 2, spacers 4 and 5, corona discharge chamber 1, and casing means 10 for housing a companion high voltage transformer 11 with its electrical connectors 12 and 13, pneumatic mechanical connector 14, and hermetic seal 16. Said casing means 10 serves to form and insulate the electrical connections 30 and 34 between the high tension electrode 2 and the high voltage transformer 11 and the drive circuitry for the high voltage transformer 11. It acts as a separator for the counter-electrode means 9 outside and in intimate contact with casing 10, and the external surface 8 of insulating tube 6 which forms said corona discharge chamber 1. Case 10 also serves as a means for protection and enclosure of said high voltage transformer 11 while allowing for efficient heat transfer and dissipation via conductive metal rod 17. Said metal rod 17 is positioned so as to be partially immersed within fluid counter-electrode 9 upon exiting the surface of casing means 10. All of the components located within casing means 10 are fixedly cemented by a dielectric epoxy resin 18 which affords mechanical strength as well as a medium for transfer of thermal energy to metal rod 17 with subsequent dissipation into fluid counter-electrode 9. Casing means 10 is formed with an integrated threaded sealable compression fitting 39. Electrical connectors 12 and 13 as well as metal rod 17 extend through the central opening of fitting 39. Threaded fitting 39 mates with female threaded fitting 40 located in the central opening of thermal vessel 19 (best illustrated in FIG. 8). This advantageous form of construction allows for releasable electrical and mechanical connections and easy exchangeability should any part of the composite tube assembly fail.

Figure 7:
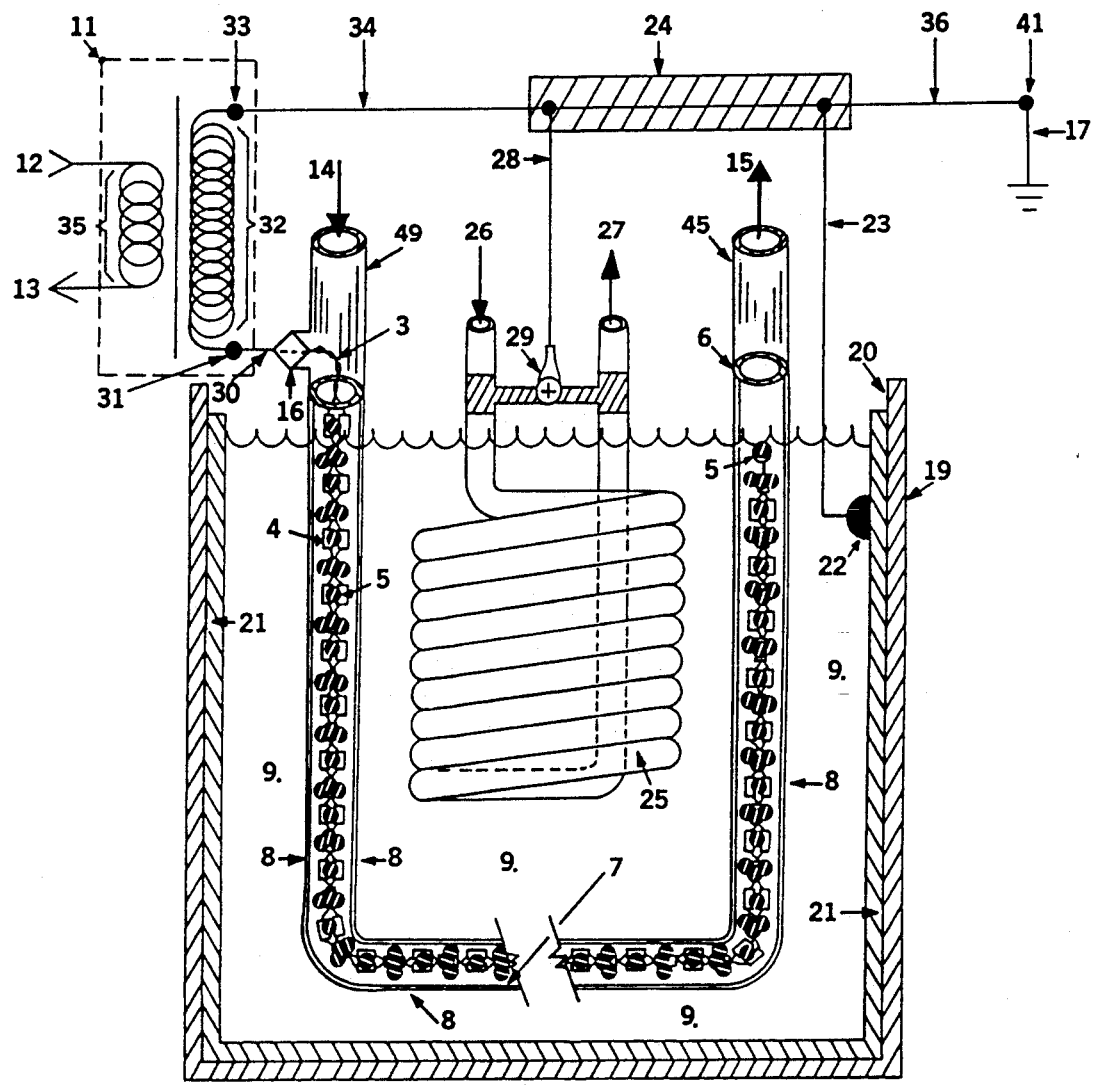
FIG. 7 shows a diagrammatic representation of the preferred embodiment including the electrical, pneumatic, and fluid connections as well as the inter-relationships of the corona discharge chamber, fluid counter-electrode, high voltage transformer, and heat exchanger.

As illustrated in FIG. 7., one can gain a better understanding of the constructional precepts of the apparatus of the present invention. The corona discharge chamber assembly 1 and specifically the outer wall surface 8 of insulative tube 6 is essentially immersed within a fluid counter-electrode 9. This construction allows the formation of an electrolytic junction between the fluid counter-electrode 9 and the outer wall surface 8 of insulative tube 6. In this way, an ozone producing corona discharge occurs within the lumen of corona discharge chamber 1 due to the potential difference between high tension electrode 2, the insulative tube 6, and fluid counter-electrode 9 when a high voltage alternating current is applied thereto. This configuration allows any heat formed within the corona discharge chamber assembly 1 to be conducted directly into fluid counter-electrode 9.

Another advantage of this construction is evident by the attainment of a relatively homogeneous electric field throughout the internal volume of the corona discharge chamber 1 during applications of high voltage resonating energy between electrode 2 and the counter-electrode 9. This relatively uniform electric field results in improved efficiency of cold-spark ozone generation because all oxygen molecules enclosed by inner wall surface 7 of insulative tube 6 will be exposed almost instantaneously to the ionizing potential of the applied resonating energy. Furthermore, this form and construction of the present invention assures a proportional electric field throughout the lumen of corona discharge chamber assembly 1 even when it is coiled into a tight configuration as illustrated in FIG. 2, and FIG. 8.

Figure 8:
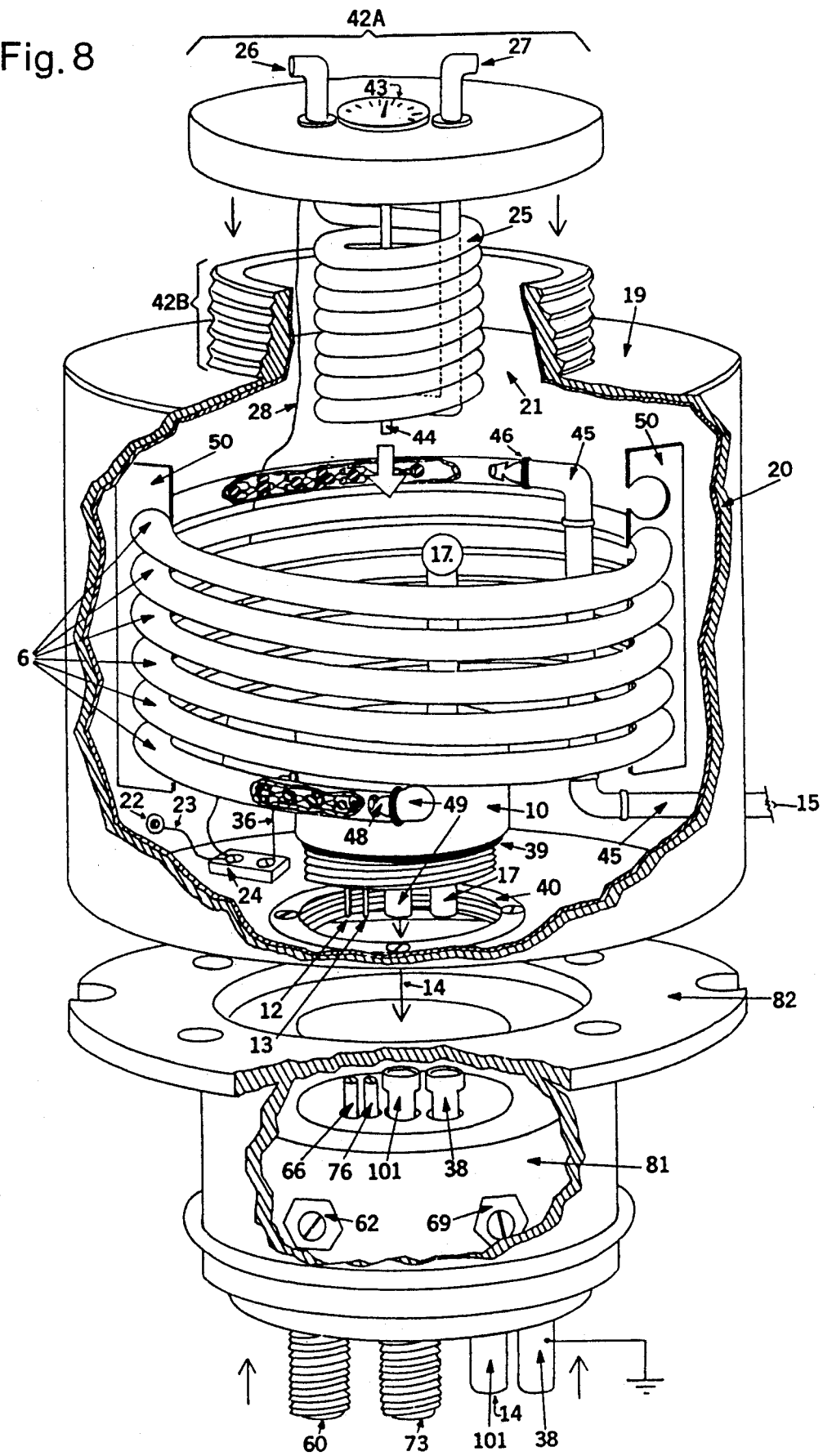
FIG. 8 shows an exploded, cutaway view of one embodiment of the apparatus of the present invention.

The inter-relationships of the corona discharge chamber, fluid counter-electrode, high voltage transformer, and heat exchanger are best shown by FIG. 7 and FIG. 8. Said corona discharge chamber assembly 1 is positioned and contained within thermally insulated container 19. Corona discharge chamber assembly 1 has an inlet port 14 for the flow of dry oxygen bearing gas and an outlet port 15 for the discharge of ozone enriched gas after the gas within the tube has been exposed to the ozonizing current. Thermally insulated container 19 has an inner wall 20 lined by a thin layer of conductive metal 21 such as copper sheeting that possess an ohmic connection 22 with conductor 23 connecting directly to earth grounding bus 24. Conductive metal 21 is in intimate contact with, and forms an electrolytic connection with, fluid counter-electrode 9.

It is particularly advantageous to formulate fluid counter-electrode 9 with an aqueous solution of ionizable copper which possesses the properties of high optical absorbance (deep blue/green color), high electrical conductivity, but low potential for reactivity with the conductive metal 21 lining the inner surface 20 of thermally insulated container 19. Because copper is located below hydrogen on the chemical electromotive series, little if any hydrogen gas is liberated during alternating current applications and thus minimal explosion hazard exists during normal operation. Metal rod 17 as well as copper sheeting 21 and soon to be described heat exchanger 25 are all advantageously formed of copper metal. Metal rod 17 also serves as a low impedance pathway to earth ground via its union with frictional connector 38. In this way, a multiplicity of sources are available for the replenishment of the minute losses of copper ions from the electrolytic fluid counter-electrode 9.

Also disposed within the fluid counter-electrode 9 is a heat exchanger means 25 formed of malleable metallic tubing, such as copper tubing through which a coolant fluid flows under the influence of a pressure differential via inlet 26 and outlet 27. Conductive heat exchanger 25 is connected to ground bus 24 via conductor 28 ohmically fastened at point 29 and also forms an electrolytic connection with counter-electrode 9. Coolant fluid flows into heat exchanger 25 under an externally applied pressure and may encompass a variety of substances including water, oil, antifreeze, etc.

Dry oxygen bearing gas flows into the corona discharge chamber assembly 1 under a pressure differential via inlet port 14 and after exposure to corona discharge an ozone enriched gas flows out of the tube via outlet port 15. The high tension electrode 2 exits lumen of the insulative tube 6 through a hermetic seal 16 located within conduit means 49. Hermetic seal 16 prevents gas loss from the lumen of conduit 49 and associated tube 6 which forms corona discharge chamber assembly 1 and provides an ohmic connection via insulated conductor 30 to the power side connection 31 of secondary coil 32 of high voltage transformer 11.

The ground potential side connection 33 of secondary coil 32 of high voltage transformer 11 is ohmically connected to ground potential via conductor 34. The primary coil 35 of high voltage transformer 11 receives intermediate level, high-voltage resonating current applied between connection point 12 and connection point 12. Grounding bus 24 makes a low impedance ohmic connection to earth ground via conductor 36, which at one end is frictionally mated via push in connector 37 fixedly mounted to case 10. Conductor 36 traverses the interior of casing means 10 and makes an ohmic connection 41 with metal rod 17 (see (FIG. 2).

Referring to FIG. 8, heat exchanger means 25 with its inlet connection port 26 and outflow port 27 is fixedly mounted as an integral component of female threaded lid assembly 42a. Additionally, thermometer 43 and its sensing tube 44 is positioned within the central opening of coolant coil 25, and fixedly mounted to lid assembly 42a. This design allows the thermometer to sense the aggregate temperature of fluid counter-electrode 9 within thermally insulated container 19 when lid assembly 42a is mated in the closed position with the male threaded connector 42b of thermally insulated container 19.

Insulative conduit 45 is fixedly mounted within thermally insulated container 19 and frictionally mates with corona discharge chamber assembly 1 via push-in connector 46 and continues to function as outlet port 15 of corona discharge chamber assembly 1. Conduit 45 penetrates the wall of thermally insulated container 19 through seal 47 and serves as a continuation of outlet port 15 for discharge of ozone enriched gas. Frictional connector 48 mates the opposing end of corona discharge chamber assembly 1 with conduit 49 serving as the continuation of inlet port 14. Frictional connector 48 also serves as an electrical conduit for high tension electrode 2 which penetrates into the interior rod case 10 and exits conduit 49 via hermetic seal 16 and makes an ohmic connection with high voltage transformer 11. Corona discharge chamber 1 is mechanically fixed within thermally insulated container 19 using dielectric support struts 50.

Figure 3A:
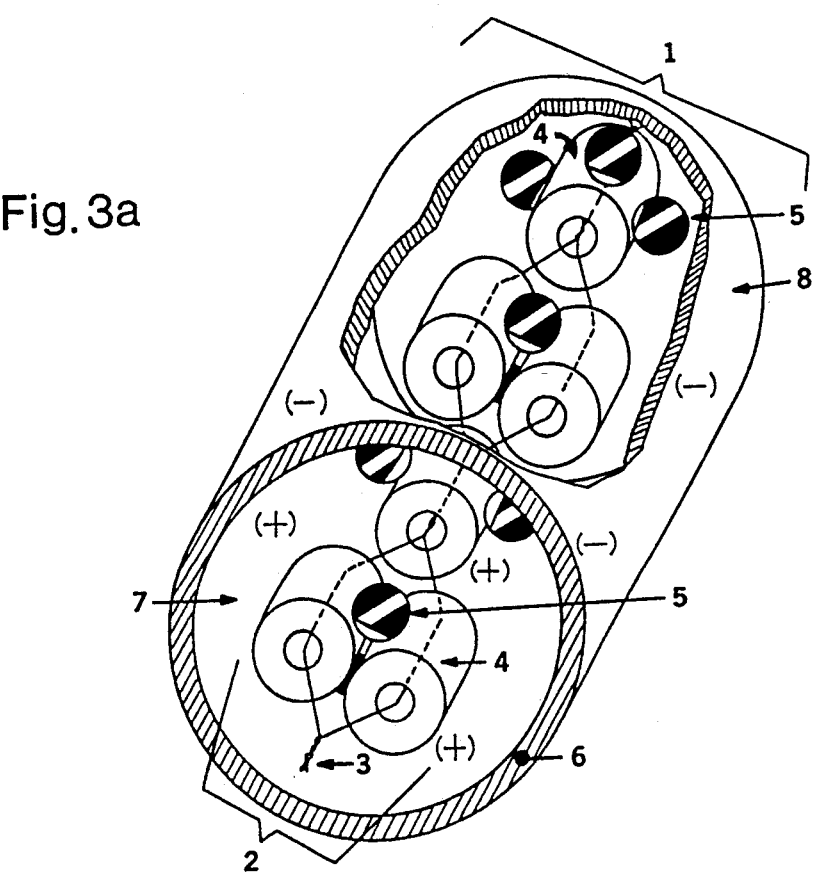
FIGS. 3a and 3b illustrate the electret effect when incorporated into the construction of the corona discharge chamber of the present invention.
Figure 3B:
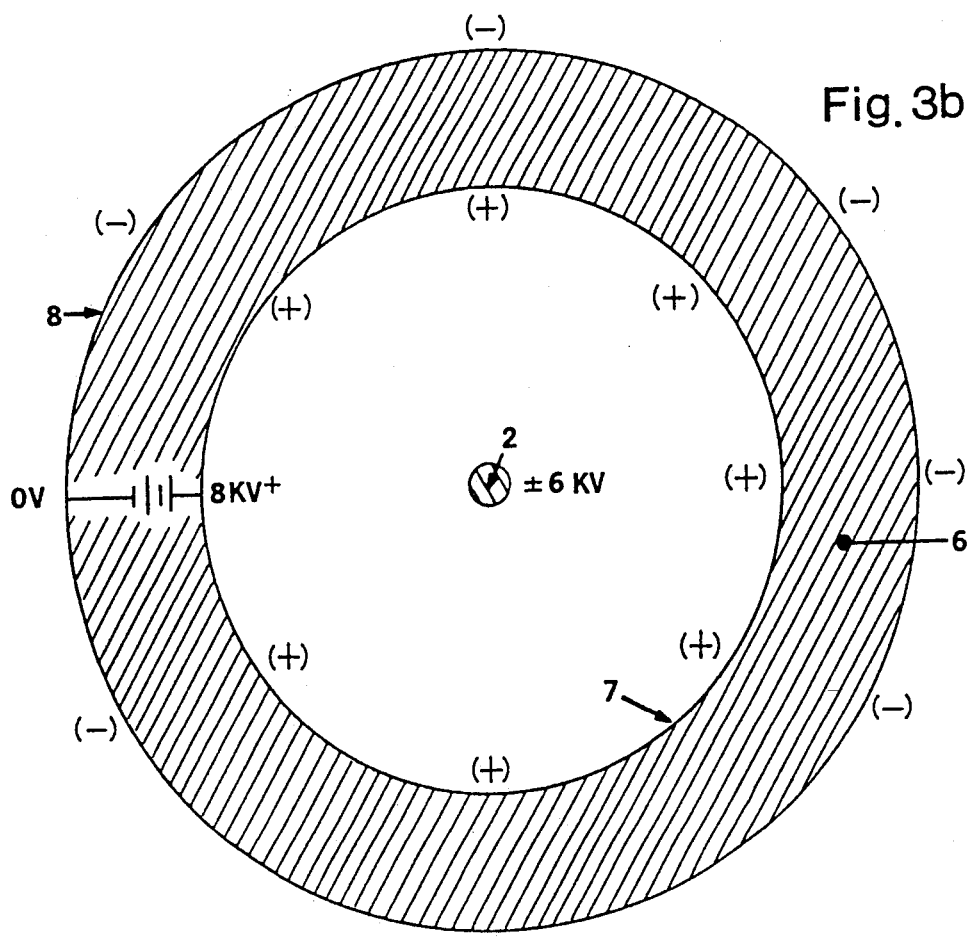

FIGS. 3a and 3b illustrate the electret effect which may be incorporated into the corona discharge chamber assembly of the present invention. The tube 6 illustrated shows the presence of a heterocharged electrostatic field incorporated in a cross sectional view. Note the presence of a positive electrostatic charge on the inner surface 7 and a corresponding negative charge on the outer surface 8 of insulative tube 6 (this effect is demonstrated in FIG. 3b by the use of the schematic symbol for battery supply drawn within the wall structure of tube 6 . . . this is included only to illustrate the presence of a fixed electrical charge across the tube wall 6. FIG. 3a illustrates the corona discharge chamber 1 of the present invention with the associated electrostatic charge potential across dielectric tube 6 which is characteristic of an electret.

Referring to FIGS. 4a and 4b a better understanding of the importance of the electret effect can be realized. Whenever alternating current is utilized to produce an ozone-forming corona discharge within and across an insulating system, there is a period of latency during each cycle. During this period (as was explained in detail in the section: Description of the Prior Art), there is insufficient ionization potential across the discharge gap to maintain corona activation.

The levels of corona start voltage (CSV) and corona extinction voltage (CEV), which define the period of corona latency, are specific characteristics of any individual tube construction. These characteristics are an effect of dielectric wall thickness, dielectric constant, tube capacitance and frequency of drive current. By fabricating a relatively permanent electrostatic charge across the tube wall 6 of corona discharge chamber 1, the baseline potential of the alternating current applied across the discharge gap can be elevated in a predictable fashion. The net effect of this alteration, is to elevate the charge potential present on inner wall surface 7 of dielectric tube 6 in a manner which causes the potential difference between inner wall surface 7 and electrode 2 to remain above corona extinction voltage (CEV) at all times when alternating current is applied between the electrode 2 and counter-electrode 9 of corona discharge chamber 1. In this way, the electret effect is advantageous to ozone production by maintaining the ionization potential of gases enclosed by corona discharge chamber 1 at a level sufficient to allow corona activation during a greater period of each cycle of energy application. FIG. 4a and FIG. 4b graphically illustrate this point. Both graphs were prepared from data obtained from prototype devices operated under similar circumstances (voltage, frequency, temperature, dielectric constant, tube and electrode length) except that the prototype of FIG. 4a did not utilize an electret charge while the prototype of FIG. 4b incorporated an 8000 volt thermo-electret. Both prototypes possessed similar characteristics of corona start voltage (CSV 3000 vac) and corona extinction voltage (CEV 1500 vac) and each was alternately driven by the same power source. Referring specifically to FIG. 4b, as the wave of alternating electrical potential is passing upward from ground at point T0 there exists a potential gradient between the electrode 2 and the inner wall surface 7 of the corona discharge chamber 1 of 8000 volts and thus, corona formation is active. The progressing wave passes through T1 and T2 in the direction of point T3, its maximum positive excursion, at which point the potential gradient across the spark gap is no lower than 2000 volts (500 volts above CEV). The corona producing wave of alternating potential begins its fall through points T4, T5, T6, T7, T8, and continues through the maximum negative excursion at point T9 where the potential gradient across the spark gap is now 14,000 volts. The wave begins its upward swing through T10 and T11 reaching ground potential at point T12 where, once again, there exists a potential gradient between the electrode 2 and the inner wall surface 7 of the corona discharge chamber 1 of 8000 volts. This improved cycle repeats itself at the frequency of alternating current applied thereto; this beneficial effect is easily observed in the electret tube by an increase in luminosity during energy application. It should be noted that the driving current across the corona discharge chamber is of the alternating type, and for this reason, the polarity of electret charge incorporated within the tube structure is of little consequence.

The corona discharge chamber 1 of the present invention functions most efficiently when an electret effect is fabricated across the dielectric tube wall 6. However, it is reasonable to forego the added expense of construction and fabrication of insulative tube 6 incorporating an electret when a lesser degree of efficiency will achieve the oxidative requirements for any particular application.

FIG. 5 is a schematic representation of the ozone producing parallel resonance circuit unique to this invention. This illustration will assist in developing an understanding of the teachings and concepts of the present invention. Intermediate voltage current, typically between 100 and 300 volts, is applied across primary coil 35 of high voltage transformer 11 between connection point 12 and connection point 13. The energy absorbed in primary coil 35 is inductively coupled to secondary coil 32 resulting in a step-up to high voltage, typically between 5,000 and 15,000 volts A.C., as measured across connection point 31 and connection point 33. This high voltage current is ohmically connected at points 31 and 33 to the primarily capacitive reactance of the corona discharge chamber 1, schematically depicted as a capacitor 1. Capacitor 1 comprises two conductive plates 2 and 9 separated from one another by an insulative space 6a. The uppermost plate 2 serves to represent the form and function of high tension electrode assembly 2 as previously described and illustrated. The lowermost plate 9 serves to represent the form and function of fluid counter-electrode 9 as previously described and illustrated. The insulative space 6a serves to schematically represent the form and function of the inner wall surface 7 of insulative tube 6 enclosing the corona discharge gap. To the right hand side of the figure is an oscillographic representation 51 of voltage versus frequency measured across the parallel resonance circuit at connection point 31 and connection point 33.

As can be seen from oscillographic presentation 51, the voltage measured across the parallel resonance circuit formed by the primarily inductive high voltage transformer 11 and the primarily capacitive corona discharge chamber 1 reaches a maximum excursion at the center frequency fc at peak 52. Peak 52 represents the frequency of electrical resonance intrinsic to these matched components. The frequency fc is the frequency at which the primarily inductive reactance of the high voltage transformer 11 and the primarily capacitive reactance of corona discharge chamber 1 will become equal but 180 degrees out of phase. In this way, the intrinsic reactive impedances of the parallel resonance circuit are minimized and thus effectively canceled. This allows for the maximum transfer of energy into the discharge gap 6a of corona discharge chamber assembly 1, when resonating current is applied to transformer 11 through the primary coil 35 via connection points 12 and 13. Employing the principle of parallel resonance greatly reduces the loss of energy from the system allowing for more efficient cold spark corona production between high tension electrode 2 and liquid counter-electrode 9. The corona discharge produced herein occurs across and through resident oxygen molecules enclosed within the lumen of corona discharge chamber 1 depicted schematically as insulative space 6a.

Figure 6:
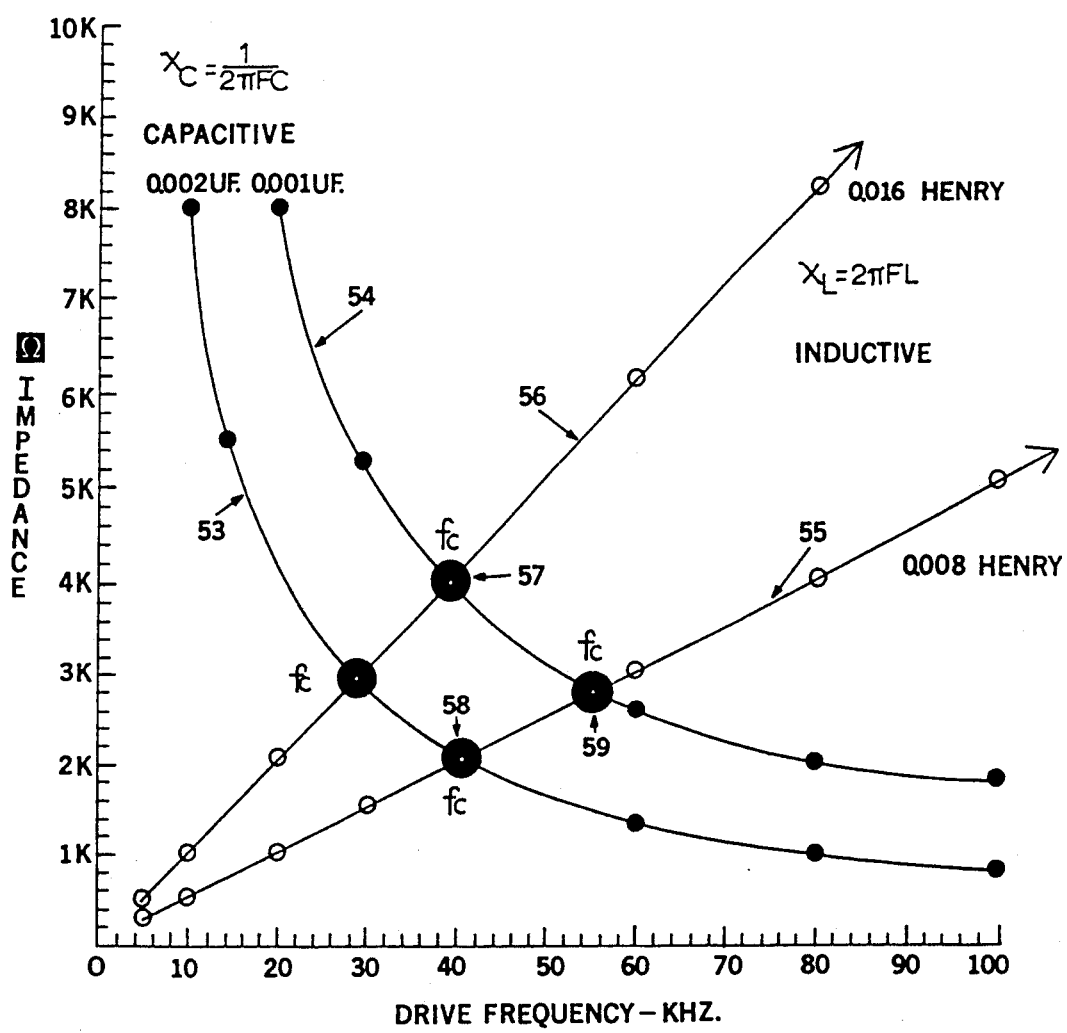
FIG. 6 is a graphic illustration showing the reactance characteristics of several values of capacitance and inductance which may be typically realized during the construction of the present invention.

A conceptual understanding of this precept of electrical reactance is clearly illustrated in FIG. 6. This figure is a graph of the impedance curves generated by two different capacitive and inductive values plotted against changing frequency. These values are representative of the variable inductive and capacitive values of different corona discharge tubes 1 and high voltage transformer 11 combinations which may be encountered in the construction and application of the present invention. The data plotted in this figure was obtained by utilizing the standard equations for capacitive and inductive reactance:

$$X_c = \frac{1}{2\pi FC}$$

wherein:
Xc = capacitive reactance measured in Ohms
F = frequency in Hertz
C = value of capacitance measured in Farads
and
$$X_L = 2\pi FL$$

wherein:

XL=inductive reactance measured in Ohms
F=frequency in Hertz
L=value of inductance measured in Henries.

Curves 53 and 54 represent the impedances measured in ohms of two different corona discharge chambers 1 possessing a capacitance value of 0.002 uf (micofarads) and 0.001 uf respectively. Lines 55 and 56 represent the impedances measured in ohms of two different high voltage transforms 11 possessing an inductive value of 16 mh (millihenries) and 8 mh respectively. This figure shows the effect of impedance changes caused by varying the frequency of current applied to any given value of inductance and/or capacitance. The large bold dots where the lines and curves intersect are abled fc and represent the center frequency of resonance for these component combinations at their respective values of impedance.

As described in the Summary of the Present Invention, it is particularly advantageous to utilize the highest possible frequency of alternating current in forming the corona discharge in an ozonizing apparatus. This situation can only be achieved when the lowest value of inductance and capacitance is employed for any particular set of matched components. By way of example, a high voltage transformer possessing a value of inductance of 16 mH line 56 will resonate with a corona discharge chamber possessing a value of capacitance o 0.001 uf curve 54 at approximately 40 KHz, fc center frequency of resonance 57. Note that curve 53 representing a corona discharge chamber 1 possessing a value of capacitance of 0.002 uf will also intersect fc 58 40 KHz with line 55 representing a high voltage transformer 11 possessing a value of inductance of 8 mH. Clearly, doubling the capacitance of the corona discharge chamber 1 can be offset by halving the inductance of the companion high voltage transformer 11. Of greater significance, is the intersection of curve 54 representing a value of capacitance of 0.001 uf and line 55 representing a value of inductance of 8 mH, where the center frequency of resonance fc 59 is approximately 56 KHz. This significant increase in frequency promotes greater transfer of energy into the corona discharge gap with a consequent increase in ozone production.

Figure 9:
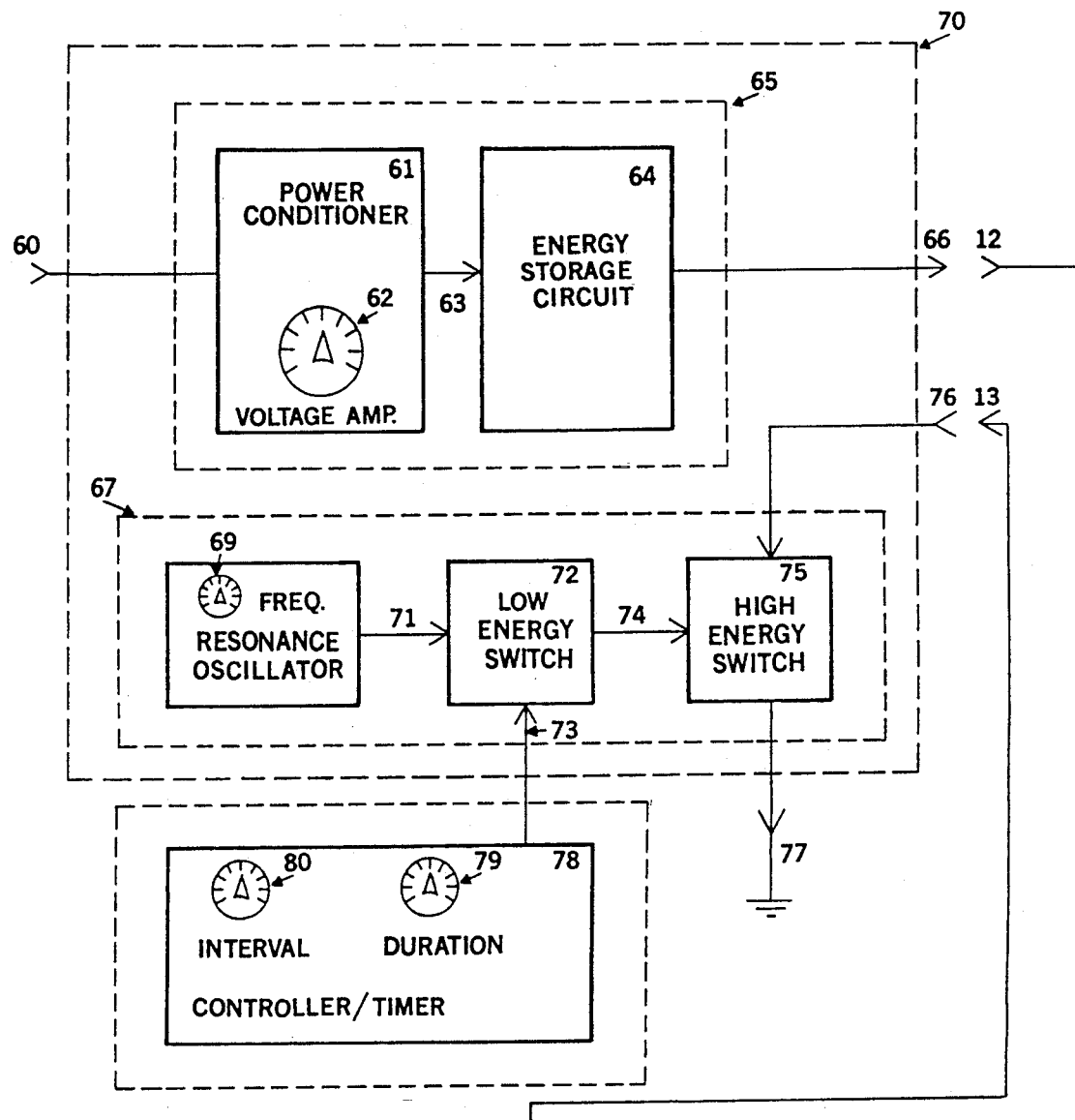
FIG. 9 is a block-form presentation of the major electrical components, their appropriate electrical connections, the inter-relationships between the subgroups of components, and their respective adjustment controls.

Referring to FIG. 9., depicted is a block diagram of the collective driving circuitry necessary to take full advantage of the electrical efficiency of the present invention. As discussed in Summary of the Invention, it is particularly advantageous to energize the corona discharge chamber 1 with adjustable quanta of resonant energy. The specific parameters which define this quanta or amount of energy are amplitude (peak voltage applied to the transformer), duration (the period of time for which the tube receives resonant alternating current during each cycle time), interval (the length of each time cycle), and finally the frequency of resonation (variable for any different corona discharge chamber 1 and high voltage transformer 11 combination).

As shown in FIG. 9, raw energy is received by the driving circuit via connector and conductive link 60 and first applied to the power conditioner 61 where the raw energy is converted or rectified in a manner well known in the prior art. The voltage voltage is adjusted to an appropriate level via potentiometer 62, and then presented to high energy storage circuit 64 by conductive link 63. Power conditioner 61 and high energy storage circuit 64 represent the high voltage section 65 which occupies a discreet segment in the driving element package 70. Also enclosed within the driving element package 70, is the resonance switching apparatus 67. Resonance switching apparatus 67 comprises an adjustable, binary oscillator 68 the output frequency of which is supplied to conductive link 71 after appropriate adjustment to resonance frequency by potentiometer 69. Low energy switch 72 is a solid-state single pole/single throw switching device which is controlled by a signal received at input 73. Conductive link 63 and conductive link 74 form the solid state switching leg of low energy switching device 72. High energy switch 75 is a solid state single pole/single throw switching device similar to low energy switch 72 but possessing a greater capacity to handle high current pulses. Conductive link 76 and conductive link 77 (connected to ground potential) form the solid state switching leg of high energy switching device 75.

For safety reasons, it would be good practice to incorporate the whole of driving element package 70 within a sealed container 81 which forms an integral and component part of base plate 82 of thermally insulated container 19 (see FIG. 8). Located within sealed container 81 is a poorly oxidizable, dielectric conduit 101 which extends beyond the enclosure walls of sealed container 81 and forms a releasable friction/seal connection with conduit member 49. In this way, the combination of member 49 and member 101 serve to form the pneumatic input port 14 of corona discharge chamber assembly 1. This form of design affords mechanical stability as well as an extreme level of protection against inadvertent electrocution.

The final important component of the driving element package 70 is the controller box 78, which comprises a solid state timer circuit adjustable for duration of output via potentiometer 79, and interval between outputs via potentiometer 80. Said controller box 78, in a preferred embodiment, would be located at some distance from and remotely linked to the driving element package 70 via conductive link 63.

In operation, high voltage energy held in storage circuit 64 is linked to the primary coil 35 of high voltage transformer 11 by the combination of connector pairs 66 and 12. Connector 13 of the primary coil 35 is combined with connector 76 to complete the circuit through the grounded switching leg 77 of high energy switch 75. High energy switch 75 will receive the output signal of binary oscillator 68 through the switching leg of low energy switch 72 when a positive polarity signal is present on conductive link 73. In this way, the high voltage energy present stored in storage circuit 64 is applied across primary coil 35 of high voltage transformer 11 at a frequency adjustable by potentiometer 69 to the intrinsic frequency of resonance which exists between high voltage transformer 11 and corona discharge chamber 1. When conductive link 73 does not possess a positive polarity signal, then low energy switch 72 is in an open state and no binary signal from oscillator 68 will pass to high energy switch 75, and thus switch 75 will assume an open condition and prevent energy flow through primary coil 35. In this way, controller 78 is able to utilize low voltage low current signal pulses to modulate the high energy required for efficient resonating corona discharge.

All components which form the driving circuitry for the present invention are well known prior art. However, as far as is known, these teachings of the electronics art have not been advantageously utilized or anticipated in the prior art of ozone gas generation. For this reason they are covered only in general terms, as there are many conceivable variations which could be advantageously applied to the teachings of the present invention.

The teachings herein comprise a number of new and novel ideas, apparatus, and methods. All of these taken singularly are important to the improved generation of ozone gas. However, when taken together they represent a quantum advance in the art of corona discharge ozone gas generation. The present invention, described herein, comprises all of these improvements. However, because one of the main goals of this disclosure is to encourage both the private and commercial use of ozone gas in oxidative applications, it is realized that the term "efficient" may have varying meanings when used to describe oxidative needs.

By way of example, the requirements would be much different to disinfect waste water for a large municipality as opposed to the requirements to disinfect the water of a small spa or hot tub. Obviously, the improved electrical efficiency of the present invention would soon offset the initial capital expenses that a municipality might incur from incorporating many of the teachings as described herein. In contrast, the added complexity of incorporating all teachings of the present invention, might be ill advised in the case of disinfecting a private spa or hot tub. In the latter example, the use of only a portion of the teachings of the present invention, could achieve the required oxidative goal at a lower cost.

As conservation of energy has become paramount for mankind's future, the present invention with its inherently improved electrical efficiency allows and encourages the use of power sources heretofore considered impractical in the traditional sense. The apparatus and methods of the present invention, due to a markedly enhanced electrical efficiency, can in theory and in practice be powered by the so-called alternative energy sources as depicted schematically in FIG. 10.

Figure 10:
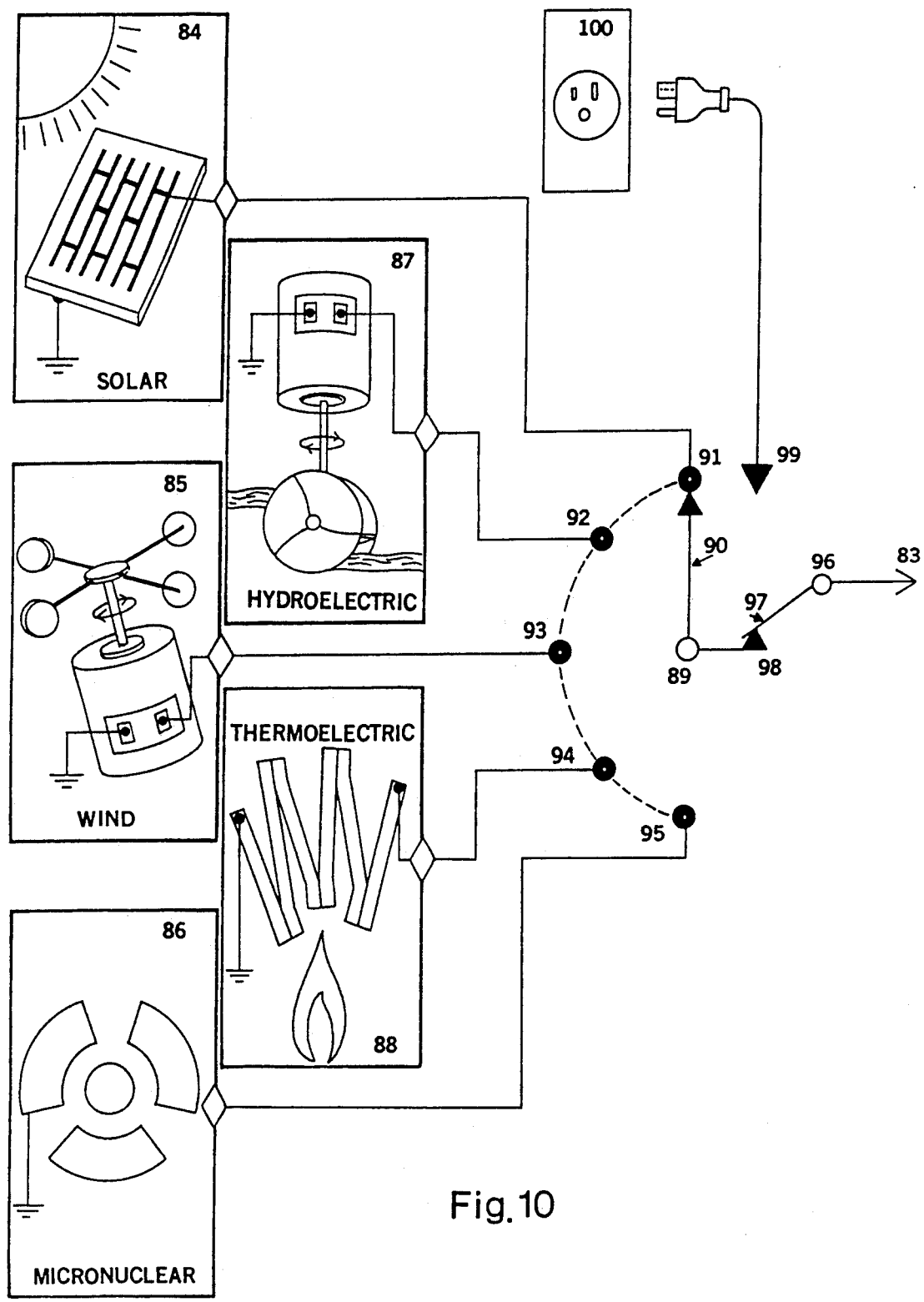
FIG. 10 illustrates the typical as well as alternative sources of power and how they may be configured and switched in the present invention.

These replaceable and natural sources of energy include solar 84, wind 85, micronuclear 86, hydroelectric 87, and thermoelectric 88. The present invention is easily configured to utilize any of these sources by a simple switching means as illustrated in FIG. 10. Rotary switch 89 with wiper blade 90 can make electrical contact at any of five (5) connection points including: conductor point 91 solar, conductor point 92 hydroelectric, conductor point 93 wind, conductor point 94 thermoelectric, and conductor point 95 micronuclear power source. A single pole/double throw switching means 96 incorporates wiper blade 97 which can make electrical contact with the output of rotary switch 89 at connection point 98 or can alternately make electrical contact with a source of mains energy 100 at connection point 12. The output of switch 96 is routed through and present at connection point 12 which forms a combination pair with input conductor and connective link 60 of power conditioner 61.

The present invention has been described in detail with particular reference to the preferred embodiments thereof, but it will be understood that variations and modifications can be effected within the spirit and scope of the invention as described and as defined in the appended claims.

What I claim is:

1. A method of ozone gas generation consisting of,
   constructing a corona discharge chamber so that a thermo-electret process is used to form an electrostatic charge across its dielectric shield member so as to enhance the period of corona activation;
   incorporating said corona discharge chamber into a parallel resonance impedance matched drive circuit;
   generating ozone gas within a flexible linear corona discharge chamber in order to simultaneously expose the gas contained therein;
   regulating the capacitive reactance of said corona discharge chamber by altering its physical length so as to change the intrinsic frequency of resonance common to said corona discharge chamber and a transformer; and
   utilizing a fluid counter-electrode to act as an electrical connection means as well as a means of thermal dissipation of reaction heat generated with said corona discharge chamber.

2. A method of ozone gas generation comprising the process steps of:
   providing a continuous flow of oxygen bearing gas into a corona discharge chamber at a known rate and with said corona discharge chamber having a known volume, whereby a time constant may be determined by the volume of the corona discharge chamber divided by the volume of gas flowing through said chamber per unit of time;
   intermittently applying known and adjustable quanta of energy to the oxygen bearing gas present within said corona discharge chamber during each time constant or fraction thereof; and
   continuously displacing ozone enriched gas from the discharge end of the corona discharge chamber by dry oxygen bearing gas entering the inlet port of said corona discharge chamber thereby allowing a continuous reposition of the process with each time constant or fraction thereof.

* * * * *